Figure 1:
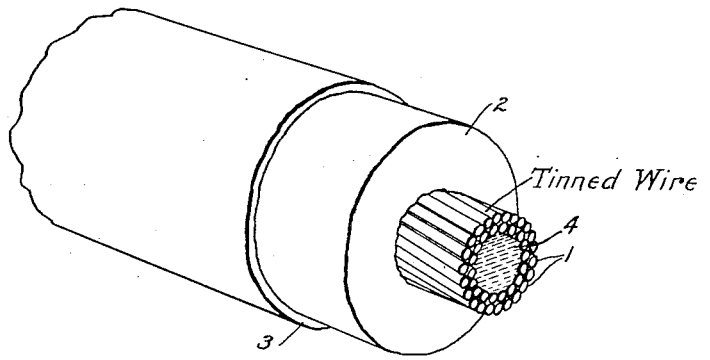

Sept. 29, 1936.                C. A. PIERCY                 2,056,017
                        HIGH TENSION OIL-FILLED CABLE
                           Filed March 18, 1933

Inventor
Carl A. Piercy,
by Charles E. Mullen
His Attorney.

Patented Sept. 29, 1936

2,056,017

UNITED STATES PATENT OFFICE 2,056,017.

HIGH TENSION OIL-FILLED CABLE

Carl A. Piercy, Ballston Lake, N. Y., assignor to General Electric Company, a corporation of New York Application March 18, 1933, Serial No. 661,523

2 Claims. (Cl. 173—266)

High tension cables as now constructed comprise a conductor composed of numerous longitudinally extending strands or wires of bare copper closely bundled together and around the bundle so formed is a body of paper insulation of suitable thickness applied layer by layer. The paper is applied in the form of narrow tapes, those of one layer breaking joint with those of another. Surrounding the insulation is an impervious lead sheath. Inside of the sheath is a conduit which is filled with oil that has been degasified as completely as practical. The conduit may be in the center of the conductor or between the insulation and the lead sheath. A system of power transmission utilizing such oil filled cable is provided, with reservoirs of variable capacity sealed against the admission of air and into and from which oil is free to flow as it expands and contracts with temperature changes. In such a system, there is considerable longitudinal movement or flow of the oil into and from the reservoirs and a relatively small radial movement of the oil from and into the paper insulation. The secret of making good cable is to extract air as fully and completely as possible from all of the parts located within the sheath and to maintain that condition at all times including the period when the cable is being installed and its subsequent operation as a carrier of electric current. It is impracticable with the facilities now available in the manufacture and installation of oil filled cable to extract all of the air from the parts within the sheath but so long as the air content does not exceed a very small amount, no trouble is experienced. However, it has happened, due to lack of care on the part of the workmen installing the cable, that more than the permissible amount of air has entered the cable during the jointing operations or with the oil with the result of increasing the dielectric loss in the insulation.

In the manufacture of the conductor, there is bound to be a certain but limited amount of copper dust inside of the finished cable, and in some cases there is a certain amount of copper oxide present either on the strands or on the electrostatic copper shields which are used in multi-conductor type cable, or both. The copper dust is formed by the action of the dies used in drawing the wire and to a limited extent to the rubbing of the bare strands on one another as the cable is reeled and unreeled in the manufacturing operations and in installing. Where such copper dust or oxide or both are present with more than the normal or predetermined amount of oxygen within the sheath, the oxygen acting on the copper forms with the oil what in the cable art is termed "copper soap" which is in the nature of a green verdigris. This soap penetrates the paper insulation and as it continues to form, the dielectric loss in the insulation progressively increases. The relatively high temperature and voltage stress on the conductor or conductors are contributing causes to the increase of the copper soap once it has started to form. In this connection, it may be stated that copper is one of the most active catalyzers in starting oxidation. The fact that the oil has considerable movement within the cable due to load changes may result in causing the minute particles of copper, or copper dust as it is commonly called, to collect at some place or places in the cable as contrasted to a wide distribution thereof. When such collection does occur, the formation of copper soap is more rapid than would otherwise be the case and hence the liability of impairment of the dielectric strength of the insulation is greater. Although it was noted in some instances that copper soap appeared in considerable amount in some oil filled cable and not at all in others or to only a very slight extent and that in a cable having said considerable amount of soap, the power factor was higher than in the other, it was only after very careful and intensive research work and tests that the reason why the soap was formed and its adverse action determined.

My invention has for its object an improved type of oil filled cable in which the formation of copper soap is wholly or largely prevented even though for any reason more than the normal amount of oxygen is present within the sheath.

In carrying out my invention, each of the strands or wires forming the conductor are carefully cleaned to remove any oxide and minute particles of dust or scale adhering thereto, after which each strand or wire is individually and carefully coated with a material which does not affect the oil used as a filling for the sheath. In so doing, care should be exercised to see that the coating is applied to the wire in such manner that no oxide is permitted to form between the cleaning and coating operations. For the covering, I may use tin, enamel or equivalent material which completely protects the copper wire from the effects of oxygen during the manufacturing and subsequent operations and use. Since the art of tinning wire is well understood and the apparatus to do it is relatively simple and inexpensive, tin may advantageously be used as the coating material, and may therefore be regarded as a concrete example of my invention. After the wires are tinned, the subsequent operations are the same as those commonly employed in making oil filled cable and hence need not be described in detail.

Figure 2:
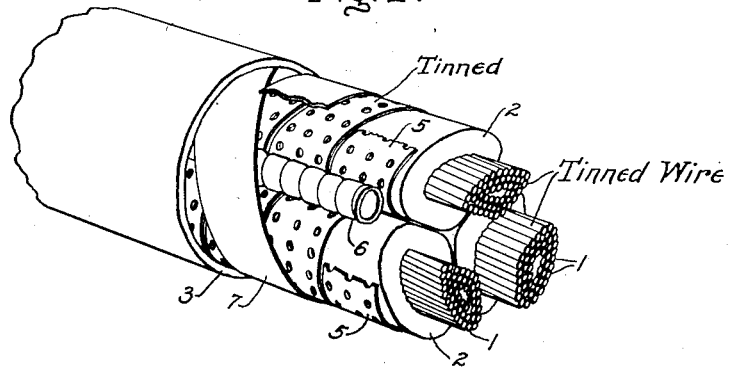

In the accompanying drawing illustrating my invention, Fig. 1 shows in perspective a piece of oil filled cable; Fig. 2 is a perspective view of a three conductor cable; and Fig. 3 shows a cable joint and filling reservoir.

1 indicates the strands of wire which are assembled or cabled around a core as usual. Each strand or wire is carefully and thoroughly coated with a thin layer of tin. Such a coating is a permanent one and is not affected by the subsequent bending of the strands or of the cable itself. It is important to fully so coat the wire because even a very small amount of exposed copper will act as a catalyzer in starting oxidation if oxygen is present. Surrounding the bundle of coated wires is a body of insulation 2 composed of paper tapes applied layer by layer in the usual manner. Surrounding the insulation is a lead sheath 3 which is impervious to oil and prevents the admission of air to the cable. The core of the conductor is filled with oil 4 under pressure which has been degasified as completely as practicable. With the cable so constructed, I use whatever accessories are necessary to protect the conductor, insulation and oil from the effects of oxygen and to maintain the oil under pressure, using for the purpose those devices which are now commercially available. The aim, of course, is to prevent the entrance of oxygen into the cable sheath as completely as possible and in this respect the usual practice is follower but should it so happen that due to carelessness on the part of the workmen in making the cable or installing it, or to a leak in the sheath or in a joint, more oxygen enters the cable than is considered permissible with cable of ordinary construction, the formation of copper soap will be prevented, by reason of the coating on the wires. It should be definitely understood that it is not intended that an unlimited amount of oxygen be permitted to enter the cable, but the contrary. One way to look at my invention is that I provide a means for protecting the integrity of a cable which might otherwise fail in a comparatively short time due to some minor fault and particularly one due to failure of the insulation, and specifically by providing means for protecting the impregnating oil from the combined effects of copper and oxygen or oxidized products.

In Fig. 2 is shown a three conductor cable in which all of the individual strands or wires are coated with tin for the reasons previously set forth. Each conductor is covered with insulation 2. Surrounding the insulation on each conductor is an electrostatic shield 5 made of copper and tinned for the same reason that the strands are tinned. In the filler spaces are permeable oil conduits 6 of any suitable construction which if made of copper or copper alloy should likewise be tinned and for the same reason. The conductors are bound together by a binding band 7, which may be made of steel. If made of copper or any other metal which adversely affects the impregnating oil, it should be tinned or otherwise similarly coated. To state the matter briefly, all of the copper within the sheath 3 is so covered or protected that it is prevented from acting on the impregnating oil in a manner to form copper soap.

Figure 3:
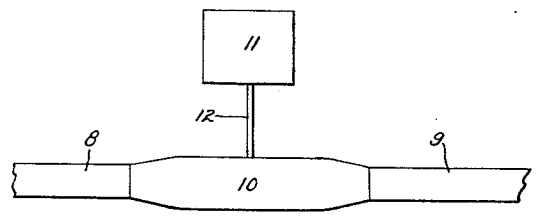

In Fig. 3, 8 and 9 illustrate pieces of cable of the kind shown in Fig. 1. The adjacent ends of the cable are jointed as usual and the joint is enclosed in a lead or other metal casing 10. Degasified oil is supplied to the cable and the joint under superatmospheric pressure by the variable capacity reservoir 11 and connecting conduit 12.

What I claim as new and desire to secure by Letters Patent of the United States, is:

1. A cable comprising a conductor operating at high potential and made up of a plurality of clean strands of substantially pure copper wire, a body of paper insulation surrounding the conductor, the value of which as an insulator is reduced when subjected to the presence of copper soap, an enclosing imperforate sheath, a body of oil which impregnates the paper and fills the sheath to the substantial exclusion of voids, said oil moving within the sheath as the temperature of the cable changes and carrying with it small free particles of metal which may be detached from the conductor, the oil and other contents of the sheath operating under super-atmospheric pressure at all times during operation of the cable, and a thin permanent covering of tin for each of the strands of the conductor which prevents the formation of copper dust due to movements of the strands one on another and also prevents the copper from being exposed to the oil and acting thereon as a catalyzer to cause the formation of copper soap.

2. A cable comprising multiple conductors operating at high potential, each made up of a plurality of clean strands of substantially pure copper wire, a body of paper surrounding each of the conductors to insulate it from the others and the sheath, the value of the paper as an insulator when subjected to copper soap being substantially reduced, an enclosing imperforate sheath, a body of oil which impregnates the paper and fills the sheath to the substantial exclusion of voids, said oil moving within the sheath as the temperature of the cable changes, the oil and other contents of the sheath operating under super-atmospheric pressure at all times during operation of the cable, an electrostatic shield of copper enclosing the insulation on each of the conductors, and a thin covering of tin for each of the strands of the conductors and also each of the shields which prevents the formation of copper dust due to movements of the copper parts and which also prevents the copper from being exposed to the oil and being acted upon thereby, said tin preventing the formation of copper dust and of copper soap between the periphery of each conductor and its surrounding insulation and between the shield and the underlying insulation.

CARL A. PIERCY.